US012602271B2

(12) United States Patent
Graham

(10) Patent No.: US 12,602,271 B2
(45) Date of Patent: Apr. 14, 2026

(54) NON-BLOCKING RING EXCHANGE ALGORITHM

(71) Applicant: MELLANOX TECHNOLOGIES, LTD., Yokneam (IL)

(72) Inventor: Richard Leigh Graham, Knoxville, TN (US)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 630 days.

(21) Appl. No.: 17/983,023

(22) Filed: Nov. 8, 2022

(65) Prior Publication Data

US 2024/0004735 A1 Jan. 4, 2024

Related U.S. Application Data

(60) Provisional application No. 63/356,923, filed on Jun. 29, 2022.

(51) Int. Cl.
G06F 9/54 (2006.01)
(52) U.S. Cl.
CPC .................................... G06F 9/546 (2013.01)
(58) Field of Classification Search
None
See application file for complete search history.

(56) References Cited

U.S. PATENT DOCUMENTS 10,284,383 B2    5/2019    Bloch et al.
11,196,586 B2    12/2021   Graham et al.

11,252,027 B2    2/2022    Ben-Moshe et al.
2004/0205781 A1*  10/2004   Hill ........................ H04L 69/329
                                                   709/227
2012/0144401 A1*   6/2012   Faraj ................. G06F 15/17318
                                                   719/313
2012/0185679 A1*   7/2012   Archer ..................... G06F 9/54
                                                   712/225

(Continued)

FOREIGN PATENT DOCUMENTS

WO     WO 2022/254253     12/2022

OTHER PUBLICATIONS

"MPI: A Message-Passing Interface Standard," University of Tennessee, Jun. 9, 2021, Version 4.0, 1139 pages.

(Continued)

*Primary Examiner* — Umut Onat
(74) *Attorney, Agent, or Firm* — Sheridan Ross P.C.

(57)          ABSTRACT

Systems, methods, and devices for performing computing operations are provided. In one example, a system is described to include an endpoint that belongs to a collective, where the endpoint receives a Send Ready Notification (SRN) message from another endpoint in the collective and conditions a response to the SRN message based on whether the collective has begun an operation. For example, when the collective has not begun the operation at the same time the SRN message is received from the other endpoint, the endpoint may transmit a Not Ready To Receive (NRTR) message back to the other endpoint that transmitted the SRN message. Additionally, the endpoint may queue the SRN message for later processing. In some embodiments, the SRN message may not be counted against a threshold quota (Ns) based on the NRTR message being transmitted back to the other endpoint.

20 Claims, 8 Drawing Sheets

(56)  References Cited

U.S. PATENT DOCUMENTS

| 2017/0012844 A1* | 1/2017 | Ellison ................. H04L 69/162 |
| 2020/0106828 A1 | 4/2020 | Elias et al. |
| 2020/0265043 A1 | 8/2020 | Graham et al. |

OTHER PUBLICATIONS

Faraj et al. "Automatic Generation and Tuning of MPI Collective Communication Routines," ICS '05: Proceedings of the 19th annual international conference on Supercomputing, Jun. 2005, pp. 393-402.
Zheng et al. "Simulation of the performance and scalability of message passing interface (MPI) communications of atmospheric models running on exascale supercomputers," Geoscientific Model Development, Aug. 2018, vol. 11, No. 8, pp. 3409-3426.

* cited by examiner

Receive SRN Message From Endpoint ⌐ 404

Determine Whether Collective Has Begun an Operation at Same Time the SRN Message is Received ⌐ 408

Condition Response to SRN Message Based on Determination ⌐ 412

Transmit NRTR Message to Endpoint that Transmitted the SRN Message ⌐ 416

Queue the SRN Message for Later Processing ⌐ 420

NON-BLOCKING RING EXCHANGE ALGORITHM

CROSS-REFERENCE TO RELATED APPLICATION

The present application claims the benefit of and priority, under 35 U.S.C. § 119, to U.S. Provisional Application Ser. No. 63/356,923, filed Jun. 29, 2022, entitled "NON-BLOCKING RING EXCHANGE ALGORITHM" the entire disclosure of which is hereby incorporated herein by reference, in its entirety, for all that it teaches and for all purposes.

FIELD OF THE DISCLOSURE

The present disclosure is generally directed toward networking and, in particular, toward advanced computing techniques employing distributed processes.

BACKGROUND

Distributed communication algorithms, such as collective operations, distribute work amongst a group of communication endpoints, such as processes. Collective operations face the challenge of having different endpoints (processes) entering the operation at different times, perhaps as the result of load imbalance in the compute portion of the application invoking these algorithms. Members of the collective participating in distributed algorithms may rely on receiving data from other members as a prerequisite for their work. As a result, a late arriving endpoint may delay progress of other members of the group.

BRIEF SUMMARY

Message Passing Interface (MPI) is a communication protocol that is used to exchange messages among processes in high-performance computing (HPC) systems. MPI, among other communication protocols, supports collective communication in accordance with a message-passing parallel programming model, in which data is moved from the address space of one process to that of another process through cooperative operations on each process in a process group. MPI provides point-to-point and collective operations that can be used by applications. These operations are associated with a defined object called a communicator. Communicators provide a mechanism to construct distinct communication spaces in which process groups can operate. Each process group is associated with a communicator and has a communicator identifier that is unique with respect to all processes inside the communicator. While embodiments of the present disclosure will be described with respect to MPI, it should be appreciated that MPI is one of many communication protocols that can be used to exchange data between distributed processes. Having all processes participating in a distributed algorithm be provided with a consistent view of group activity in the operation supports the use of adaptive algorithms.

Modern computing and storage infrastructure use distributed systems to increase scalability and performance. Common uses for such distributed systems include: datacenter applications, distributed storage systems, and HPC clusters running parallel applications While HPC and datacenter applications use different methods to implement distributed systems, both perform parallel computation on a large number of networked compute nodes with aggregation of partial results or from the nodes into a global result. Many datacenter applications such as search and query processing, deep learning, graph and stream processing typically follow a partition-aggregation pattern.

Typically, HPC systems contain thousands of nodes, each having tens of cores. It is common in MPI to bind each process to a core. When launching an MPI job, the user specifies the number of processes to allocate for the job. These processes are distributed among the different nodes in the system. The MPI standard defines blocking and non-blocking forms of barrier synchronization, broadcast, gather, scatter, gather-to-all, all-to-all gather/scatter, reduction, reduce-scatter, and scan. A single operation type, such as alltoall, may have several different variants, such as alltoall and alltoallv. These collective operations scatter or gather data from all members to all members of a process group. In the operation alltoall, each process in the communicator sends a fixed-size message to each of the other processes. The operation alltoallv is similar to the operation alltoall, but the messages may differ in size.

For those collective operations that are capable of accounting for the order in which members (e.g., endpoints, processes, or other network elements having computing resources) enter the collective and changing algorithm flow based on the order of arrival, having the ability to detect the order of arrival in an efficient manner provides the opportunity to improve the overall completion time for the collective. The ring algorithm used in some implementations of the MPI alltoallv is an example of an algorithm that under the right conditions may benefit from knowing the order of arrival. If the order of entry into the algorithm is used as an ordering parameter in the ring rather than the rank within the MPI communicator (the group), one can communicate with other ranks that have already joined the operation, rather than being blocked by trying to communicate with ranks yet to arrive.

Embodiments of the present disclosure aim to improve the overall efficiency and speed with which collective operations are performed by using order of arrival as an ordering parameter. Such an approach helps avoid the delay that would otherwise be associated with waiting for all members to join the collective.

Illustratively, and without limitation, a device is disclosed herein to include: sending circuitry that sends a Send Ready Notification (SRN) message to a first endpoint, wherein the first endpoint corresponds to one of a plurality of endpoints belonging to a collective and wherein each of the plurality of endpoints in the collective follows a data exchange pattern; receiving circuitry that receives another SRN message from a second endpoint in the plurality of endpoints; and response circuitry that conditions a response to the SRN message received from the second endpoint based on whether the collective has begun an operation.

In some embodiments, when the collective has not begun the operation at the same time the SRN message is received from the second endpoint, the response circuitry transmits a Not Ready To Receive (NRTR) message back to the second endpoint.

In some embodiments, when the collective has not begun the operation at the same time the SRN message is received from the second endpoint, the response circuitry queues the SRN message received from the second endpoint.

In some embodiments, when the collective has begun the operation at the same time the SRN message is received from the second endpoint, the response circuitry determines if a number of outstanding Receiver-Ready (RR) operations is less than a first threshold (Nr) that defines a maximum number of outstanding receives in flight for a given endpoint from another endpoint among the collective.

In some embodiments, the response circuitry initiates a data request from the second endpoint in response to determining that the number of outstanding RR operations is less than Nr.

In some embodiments, the response circuitry queues the SRN message in response to determining that the number of outstanding RR operations is greater than or equal to Nr.

In some embodiments, the data exchange pattern corresponds to a global communication pattern in which each endpoint in the collective sends data to each other endpoint and wherein each endpoint in the collective receives data from each other endpoint.

In some embodiments, the data exchange pattern corresponds to a global communication pattern in which no more than a first predetermined number, Ns, of outstanding sends are in flight from or to a given endpoint in the collective and no more than a second predetermined number, Nr, of outstanding receives are in flight from or to the given endpoint.

In some embodiments, additional endpoints are allowed to join the collective at an arbitrary time.

In some embodiments, the response circuitry is enabled to respond to the SRN message from the second endpoint when a RR message is received or when a new endpoint enters the collective In another example, a system is disclosed herein to include: an endpoint that belongs to a collective, wherein the endpoint receives an SRN message from another endpoint in the collective and conditions a response to the SRN message based on whether the collective has begun an operation.

In some embodiments, when the collective has not begun the operation at the same time the SRN message is received from the another endpoint, an NRTR message is transmitted back to the another endpoint that transmitted the SRN message.

In some embodiments, when the collective has not begun the operation at the same time the SRN message is received from the another endpoint, the SRN message received from the another endpoint is queued for later processing by the endpoint.

In some embodiments, the SRN message is not counted against a threshold quota (Ns) based at least in part on the NRTR message being transmitted back to the another endpoint, where Ns defines a maximum number of outstanding sends that can be transmitted from a given endpoint to another endpoint among the collective.

In some embodiments, each endpoint in the collective follows a data exchange pattern.

In some embodiments, when the collective has begun the operation at the same time the SRN message is received at the endpoint, the endpoint determines if a number of outstanding RR operations is less than a first threshold (Nr) that defines a maximum number of outstanding receives in flight for a given endpoint among the collective.

In another example, a method is disclosed herein that comprises: receiving an SRN message from an endpoint, wherein the endpoint corresponds to one of a plurality of endpoints belonging to a collective, and wherein each of the plurality of endpoints in the collective follows a data exchange pattern; determining whether the collective has begun an operation at the same time the SRN message is received; and conditioning a response to the SRN message based on determining whether the collective has begun the operation at the same time the SRN message is received.

In some embodiments, when the collective has not begun the operation at the same time the SRN message is received, the method further comprises: transmitting an NRTR message back to the endpoint that transmitted the SRN message.

In some embodiments, the method further comprises: queuing the SRN message for later processing in response to determining that the collective has not begun the operation at the same time the SRN message is received.

In some embodiments, the method further comprises: determining that the collective has begun the operation; in response to determining that the collective has begun the operation, determining whether a number of outstanding RR operations is less than a first threshold (Nr) that defines a maximum number of outstanding receives in flight for a given endpoint among the collective; and transmitting a data request to the given endpoint based at least in part on the number of outstanding RR operations being less than Nr.

Additional features and advantages are described herein and will be apparent from the following Description and the figures.

BRIEF DESCRIPTION OF THE SEVERAL VIEWS OF THE DRAWINGS

The present disclosure is described in conjunction with the appended figures, which are not necessarily drawn to scale.

DETAILED DESCRIPTION

Figure 1A:
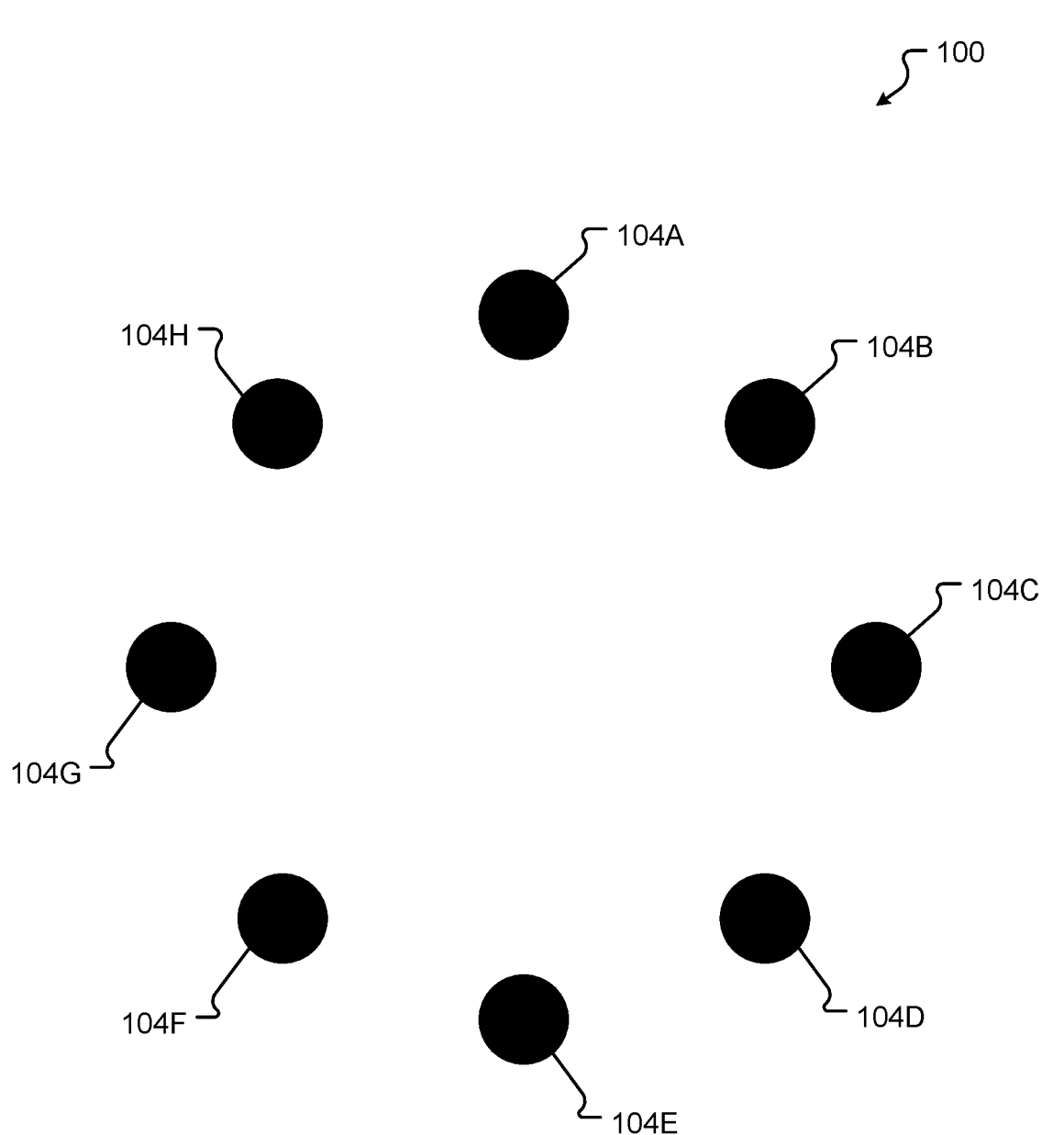
FIGS. 1A, 1B, 1C, and 1D illustrate a diagram of a computing system in accordance with at least some embodiments of the present disclosure.

The ensuing description provides embodiments only, and is not intended to limit the scope, applicability, or configuration of the claims. Rather, the ensuing description will provide those skilled in the art with an enabling description for implementing the described embodiments. It being understood that various changes may be made in the function and arrangement of elements without departing from the spirit and scope of the appended claims.

It will be appreciated from the following description, and for reasons of computational efficiency, that the components of the system can be arranged at any appropriate location within a distributed network of components without impacting the operation of the system.

Furthermore, it should be appreciated that the various links connecting the elements can be wired, traces, or wireless links, or any appropriate combination thereof, or any other appropriate known or later developed element(s) that is capable of supplying and/or communicating data to and from the connected elements. Transmission media used as links, for example, can be any appropriate carrier for electrical signals, including coaxial cables, copper wire and fiber optics, electrical traces on a Printed Circuit Board (PCB), or the like.

As used herein, the phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means: A alone, B alone, C alone, A and B together, A and C together, B and C together, or A, B and C together.

The term "automatic" and variations thereof, as used herein, refers to any appropriate process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

The terms "determine," "calculate," and "compute," and variations thereof, as used herein, are used interchangeably and include any appropriate type of methodology, process, operation, or technique.

Various aspects of the present disclosure will be described herein with reference to drawings that are schematic illustrations of idealized configurations.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and this disclosure.

As used herein, the singular forms "a," "an," and "the" are intended to include the plural forms as well, unless the context clearly indicates otherwise. It will be further understood that the terms "comprise," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. The term "and/or" includes any and all combinations of one or more of the associated listed items.

Referring now to FIGS. 1-5, various systems and methods for performing collective operations will be described in accordance with at least some embodiments of the present disclosure. While embodiments will be described in connection with particular operations (e.g., alltoall or alltoallv), it should be appreciated that the concepts and features described herein can be applied to any number of operations. Indeed, the features described herein should not be construed as being limited to the particular types of collective operations depicted and described.

Embodiments of the present disclosure aim to guarantee, to the extent possible, that messages will be processed as one or more endpoints start participating in a collective operation or arrive to the collective. For example, endpoints may arrive at the collective operation at arbitrary times relative to each other, thus the amount of time that may be taken to complete a given send or receive depends on network communication characteristics as well as when a given communication peer (e.g., endpoint) enters the collective operation. In some cases, late arriving endpoints may halt completion of individual data exchanges. One or more endpoints that are participating in the data exchange (e.g., the collective operation) may have data destined to other endpoints that are also active, but the late arriving endpoints may block further data exchange from occurring. Subsequently, communication may continue as the remaining endpoints start participating in the collective operation. Accordingly, as described and provided herein, endpoints may participate in a message exchange to ensure sending and receiving endpoints are both ready to participate in the collective operation (e.g., based in part on whether the collective operation has begun), such that the sending and receiving endpoints are not blocked from performing data or message exchanges prior to the collective operation beginning.

Referring initially to FIG. 1A, an illustrative system 100 is shown in which members/processes/endpoints are organized into a collective. The collective shown in FIG. 1 includes multiple endpoints 104 (e.g., network elements or other devices) that all contribute computing resources to the collective. For example, the system 100 may include a first endpoint 104A, a second endpoint 104B, a third endpoint 104C, a fourth endpoint 104D, a fifth endpoint 104E, a sixth endpoint 104F, a seventh endpoint 104G, and an eight endpoint 104H, that form the collective and contribute computing resources to the collective. While eight (8) endpoints 104 are included in the example of the collective illustrated in FIGS. 1A-1D, the collective (and corresponding techniques described herein) may include any number of endpoints 104 (e.g., greater than or less than eight (8) endpoints).

In some embodiments, the system 100 and corresponding collective formed by the multiple endpoints 104 may represent a ring network topology, ring algorithm, ring exchange algorithm, etc. A ring algorithm may be used in a variety of algorithms and, in particular, for collective data exchange algorithms (e.g., such as MPI alltoall, MPI alltoallv, MPI allreduce, MPI reduce, MPI barrier, other algorithms, OpenSHMEM algorithms, etc.).

Additionally or alternatively, while FIGS. 1A-1D and the techniques will be described in the example of a ring network topology or ring algorithm, the system 100 and corresponding collective may use any data exchange pattern that corresponds to a global communication pattern that implements algorithms that are collective in nature (e.g., all endpoints in a well-defined set of end-points participate in the collective operation). For example, the system 100 may comprise an ordered list of communication endpoints (e.g., the endpoints 104 are logically arranged in a structured order or pattern), where each endpoint 104 in the collective sends data to each other endpoint 104 (e.g., the data may be zero (0) bytes) and where each endpoint 104 in the collective receives data from each other endpoint 104 (e.g., the data may be zero (0) bytes). In some examples, the data exchange pattern and/or global communication pattern implemented by the collective may be referred to as an all-to-all communication pattern.

In some embodiments, the system 100 and collective may include one or more algorithm restrictions. For example, the collective may represent a global communication pattern in which no more than a first predetermined number, Ns, of outstanding sends are in flight from or to a given endpoint 104 among the collective and no more than a second predetermined number, Nr, of outstanding receives are in flight from or to the given endpoint 104. Subsequently, new sends for an endpoint 104 may be blocked when a number of outstanding sends for the endpoint 104 reaches Ns.

Additionally, new receives for an endpoint 104 may be blocked when number of outstanding receives for the endpoint 104 reaches Nr.

All endpoints 104 of the collective may follow a fixed data exchange pattern of data exchange. In some examples, communication among the collective may be initiated with a subset of the endpoints 104. Accordingly, the fixed global pattern may ensure that one endpoint 104 will not reach a deadlock, and the data exchange is guaranteed to complete (e.g., barring system failures). For example, each endpoint 104 may be labeled as Pi (e.g., the first endpoint 104A is labeled as P1, the second endpoint 104B is labeled as P2, . . . , etc., up to the eight endpoint 104H being labeled as P8). Subsequently, for sending, each endpoint, Pi, may start by posting Ns send messages to Pi+0, Pi+1, Pi+(Ns−1), with warp-around. When one send completes, the endpoint may post a send to Pi+Ns, and when the next send completes, the endpoint may post a send to Pi+Ns+1, etc. Additionally, for receiving, each endpoint, Pi, may start by posting Nr receive messages to Pi−0, Pi−1, . . . , Pi−(Nr−1), with wrap-around. When one receive completes, the endpoint may post a receive to Pi−Nr, and when the next receive completes, the endpoint may post a receive to Pi−(Nr+1), etc.

Figure 1B:
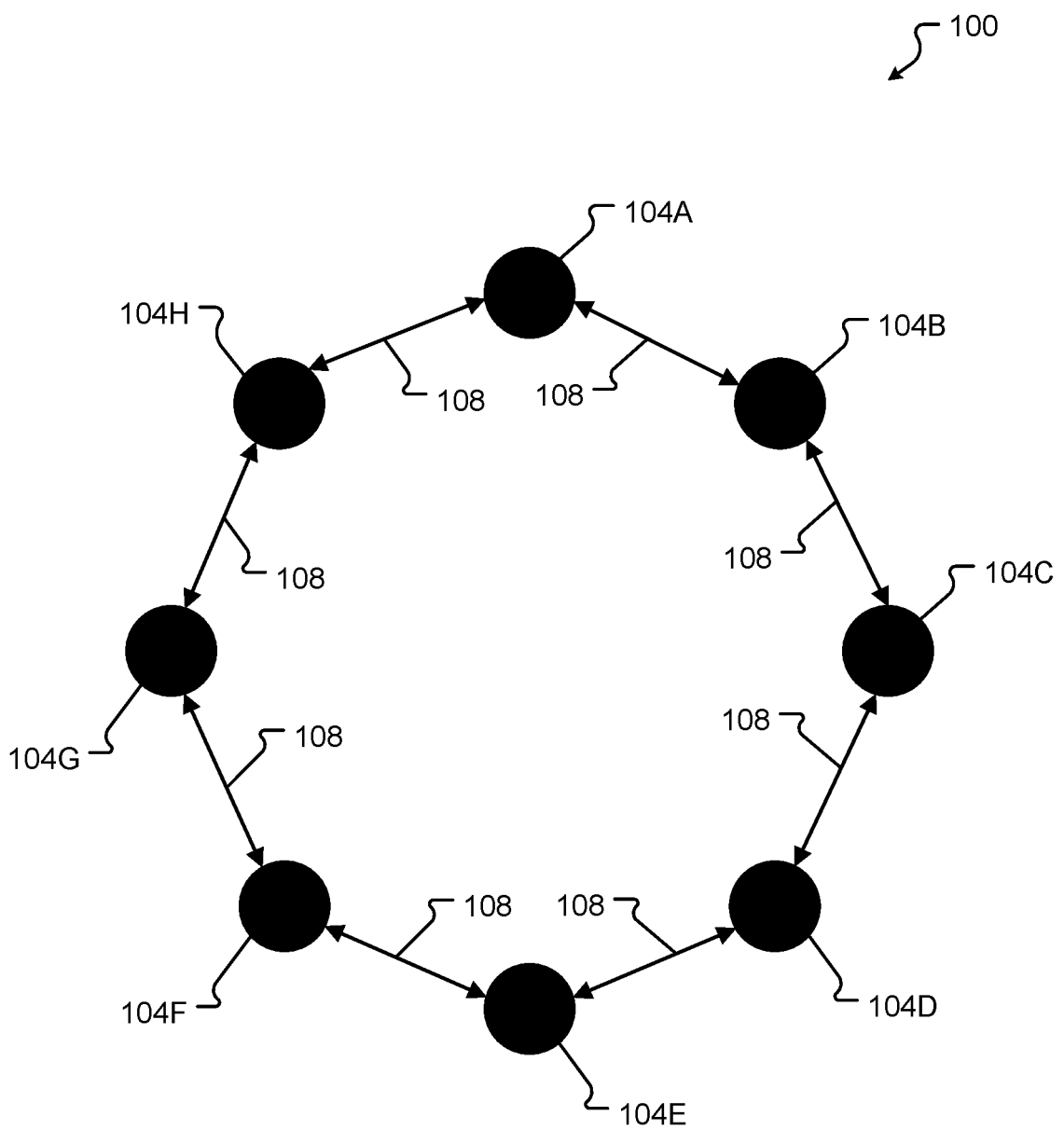

In the example of FIG. 1A, each endpoint 104 may be labeled (e.g., to represent their order in the collective and the fixed data exchange pattern). Additionally, each endpoint 104 may begin the collective by sending and receiving messages to themselves (e.g., each endpoint, Pi, sends and receives messages to/from Pi+0 and Pi−0). In the example of FIG. 1B, each endpoint 104 may participate in a data exchange 108 with a next ordered endpoint 104 in the collective.

For example, each endpoint, Pi, may post a send message to a next ordered endpoint, Pi+1, and each endpoint, Pi, may post a receive to a preceding ordered endpoint, Pi−1. As an illustrative example, the first endpoint 104A (e.g., P1) may post a send message to the second endpoint 104B (e.g., P2) and may post a receive message to the eight endpoint 104H (e.g., P8) with wrap-around.

Figure 1C:
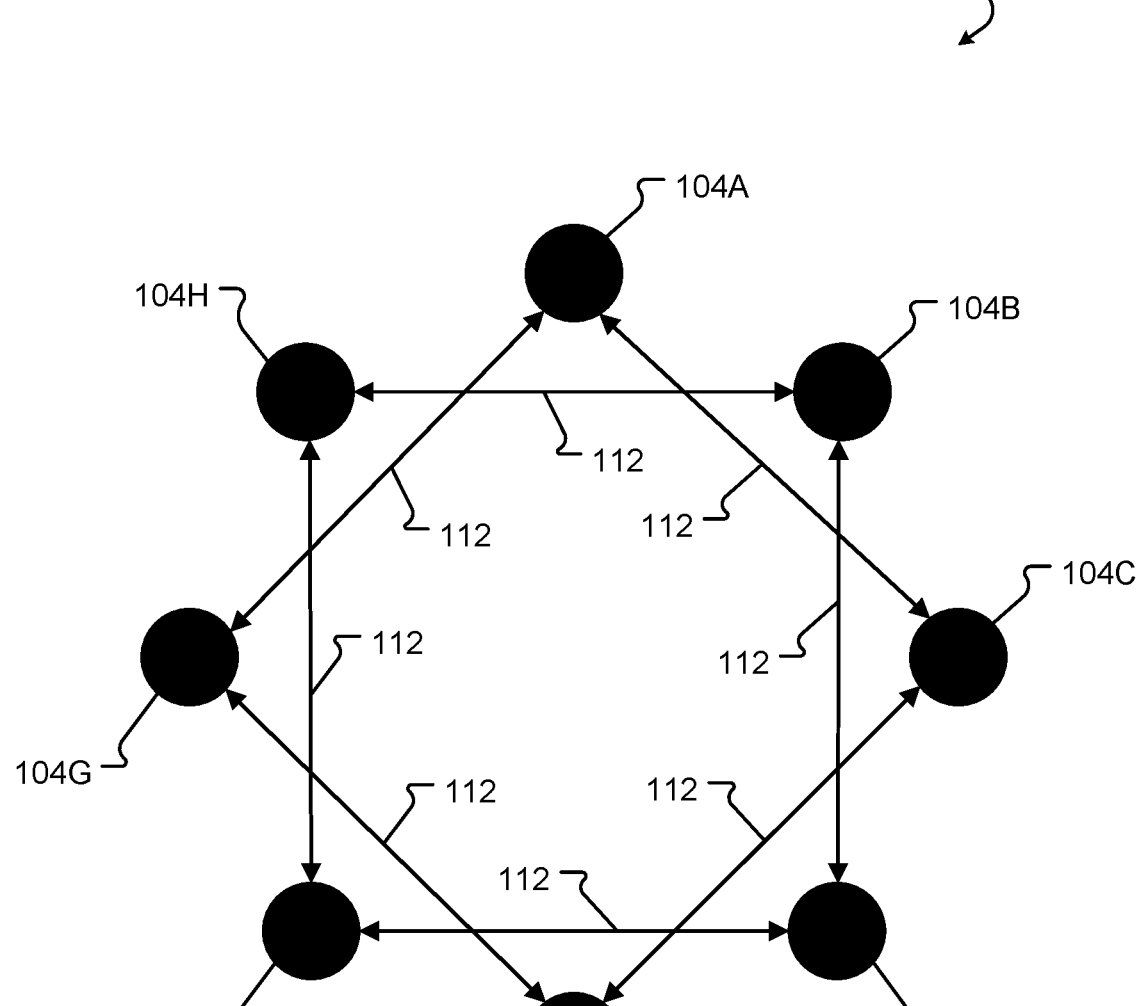

In the example of FIG. 1C, each endpoint 104 may participate in a data exchange 112 with a next ordered endpoint 104 in the collective, where the next ordered endpoint 104 is next in the collective and corresponding fixed data exchange pattern relative to the endpoint 104 of the data exchange 108 as described with reference to FIG. 1B. For example, each endpoint, Pi, may post a send message to a next ordered endpoint, Pi+2, and each endpoint, Pi, may post a receive to a preceding ordered endpoint, Pi−2. As an illustrative example, the first endpoint 104A (e.g., P1) may post a send message to the third endpoint 104C (e.g., P3) and may post a receive message to the seventh endpoint 104G (e.g., P7) with wrap-around.

Figure 1D:
Figure 1D:
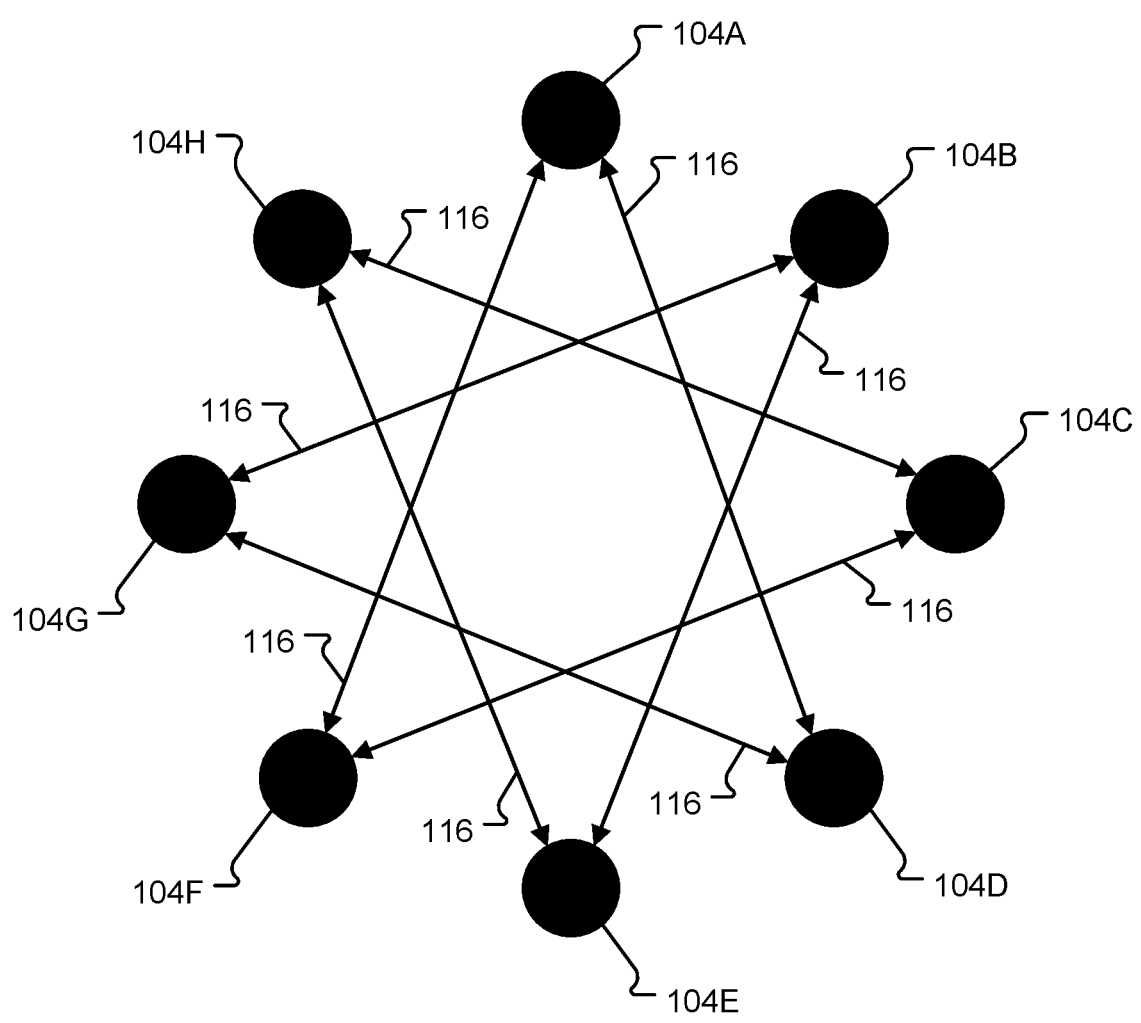

In the example of FIG. 1D, each endpoint 104 may participate in a data exchange 116 with a next ordered endpoint 104 in the collective, where the next ordered endpoint 104 is next in the collective and corresponding fixed data exchange pattern relative to the endpoint 104 of the data exchange 112 as described with reference to FIG. 1C. For example, each endpoint, Pi, may post a send message to a next ordered endpoint, Pi+3, and each endpoint, Pi, may post a receive to a preceding ordered endpoint, Pi−3. As an illustrative example, the first endpoint 104A (e.g., P1) may post a send message to the fourth endpoint 104D (e.g., P4) and may post a receive message to the sixth endpoint 104F (e.g., P6) with wrap-around.

In some embodiments, the internal data exchange described in the example of FIG. 1A and the data exchanges

108, 112, and 116 may occur simultaneously or nearly simultaneously. Additionally or alternatively, a subset of the data exchanges may occur simultaneously or nearly simultaneously. Additionally or alternatively, the data exchanges may occur separately or independently. For example, Ns and Nr may dictate a number of data exchanges the endpoints 104 are capable of performing at a time. If Nr and Ns are equal to one (1) (e.g., each endpoint 104 can send/receive one message at a time), each of the data exchanges illustrated in the examples of FIGS. 1A, 1B, 1C, and 1D may occur consecutively (e.g., each data exchange is not performed until the preceding data exchange is completed).

If Nr and Ns are equal to two (2) (e.g., each endpoint 104 can send/receive two messages at a time), the data exchanges illustrated in the examples of FIGS. 1A and 1B may occur simultaneously or nearly simultaneously. Subsequently, the data exchange 112 illustrated in the example of FIG. 1C may occur after either or both of the data exchanges illustrated in the examples of FIGS. 1A and 1B complete, and the data exchange 116 illustrated in the example of FIG. 1D may occur after both the data exchanges illustrated in the examples of FIGS. 1A and 1B complete and/or after the data exchange 112 completes (e.g., if either of the data exchanges illustrated in the examples of FIGS. 1A and 1B have not been completed). That is, a subsequent data exchange may occur when a number of outstanding sends or receives becomes less than Ns and/or Nr.

If Nr and Ns are equal to three (3) (e.g., each endpoint 104 can send/receive three messages at a time), the data exchanges illustrated in the examples of FIGS. 1A, 1B, and 1C may occur simultaneously or nearly simultaneously. Subsequently, the data exchange 116 illustrated in the example of FIG. 1D may occur after any one of the data exchanges illustrated in the examples of FIGS. 1A, 1B, and 1C completes (e.g., a subsequent data exchange may occur when a number of outstanding sends or receives becomes less than Ns and/or Nr). If Nr and Ns are equal to or greater than four (4) (e.g., each endpoint 104 can send/receive four or more messages at a time), the data exchanges illustrated in the examples of FIGS. 1A, 1B, 1C, and 1D may occur simultaneously or nearly simultaneously.

While described above as having the same values, Nr and Ns may be different values (e.g., each endpoint 104 may support a different number of outstanding sends than a number of outstanding receives). Additionally, Nr and Ns may be assigned specific to each endpoint 104, or each endpoint 104 in the collective may be assigned same values for Nr and/or Ns.

In some examples, one or more endpoints 104 may arrive at the collective operation at arbitrary times relative to each other. For example, endpoints 104 (e.g., processes, processors, etc.) may perform other operations in a data center (e.g., other collective operations, training other models, performing other data exchanges, etc.) and may join the collective operation when the other operations are completed, leading to the endpoints 104 joining to the collective operation arbitrarily with respect to each other. Accordingly, the amount of time that may be taken to complete a given send or receive depends on network communication characteristics as well as when a given communication peer (e.g., endpoint) enters the collective operation.

In some cases, late arriving endpoints may halt completion of individual data exchanges. One or more endpoints that are participating in the data exchange (e.g., the collective operation) may have data destined to other endpoints that are also active, but the late arriving endpoints may block further data exchange from occurring. For example, the further data exchanges may be blocked from occurring when an endpoint has yet to join the collective operation but other endpoints are still attempting to send/receive data from the endpoint that has yet to join. The attempted send/receive operations may then count against the Nr and Ns thresholds for the endpoints and may prevent the endpoints from performing new sends and/or new receives (e.g., for other operations, to active endpoints in the collective, etc.). Subsequently, communication may only continue as the remaining endpoints start joining and participating in the collective operation.

Accordingly, as described and provided herein, the endpoints 104 may participate in a message exchange to ensure sending and receiving endpoints are both ready to participate in the collective operation (e.g., based in part on whether the collective operation has begun), such that the sending and receiving endpoints are not blocked from performing data or message exchanges prior to the collective operation beginning. For example, a sending endpoint may send a Send Ready Notification (SRN) message to a receiving endpoint, and the receiving endpoint may condition a response to the SRN message received from the sending endpoint based on whether the collective has begun an operation. If the collective has not begun the operation at the same time the SRN message is received from the sending endpoint, the receiving endpoint may transmit a Not Ready To Receive (NRTR) message back to the sending endpoint. Additionally, the receiving endpoint may queue the SRN message for later processing. In some embodiments, the SRN message may not be counted against a threshold quota for the sending endpoint (Ns) based on the NRTR message being transmitted from the receiving endpoint back to the sending endpoint.

If the collective has begun the operation at the same time the SRN message is received from the sending endpoint or after the SRN message is received and has been queued, the receiving endpoint may determine if a number of outstanding Receiver-Ready (RR) operations is less than Nr (e.g., a maximum number of outstanding receives in flight for a given endpoint from another endpoint among the collective) and may initiate a data request from the sending endpoint in response to determining that the number of outstanding RR operations is less than Nr.

Additionally or alternatively, the receiving endpoint may queue the SRN message in response to determining that the number of outstanding RR operations is greater than or equal to Nr. In some embodiments, the SRN message on the receive side may not necessarily be processed because the collective has not yet started. This means that the receiving endpoint will queue processing the SRN message for a later time (e.g., after sending the NRTR). Until such time, the SRN message may be considered part of a pending request. Once the corresponding collective is posted on the receiving endpoint, the pending request can be unconditionally removed from a pending request list. At this point, the SRN message may be serviced immediately if the Nr counter allows, or the SRN message will be processed later when the Nr becomes small enough (e.g., less than a predetermined threshold).

Figure 2:
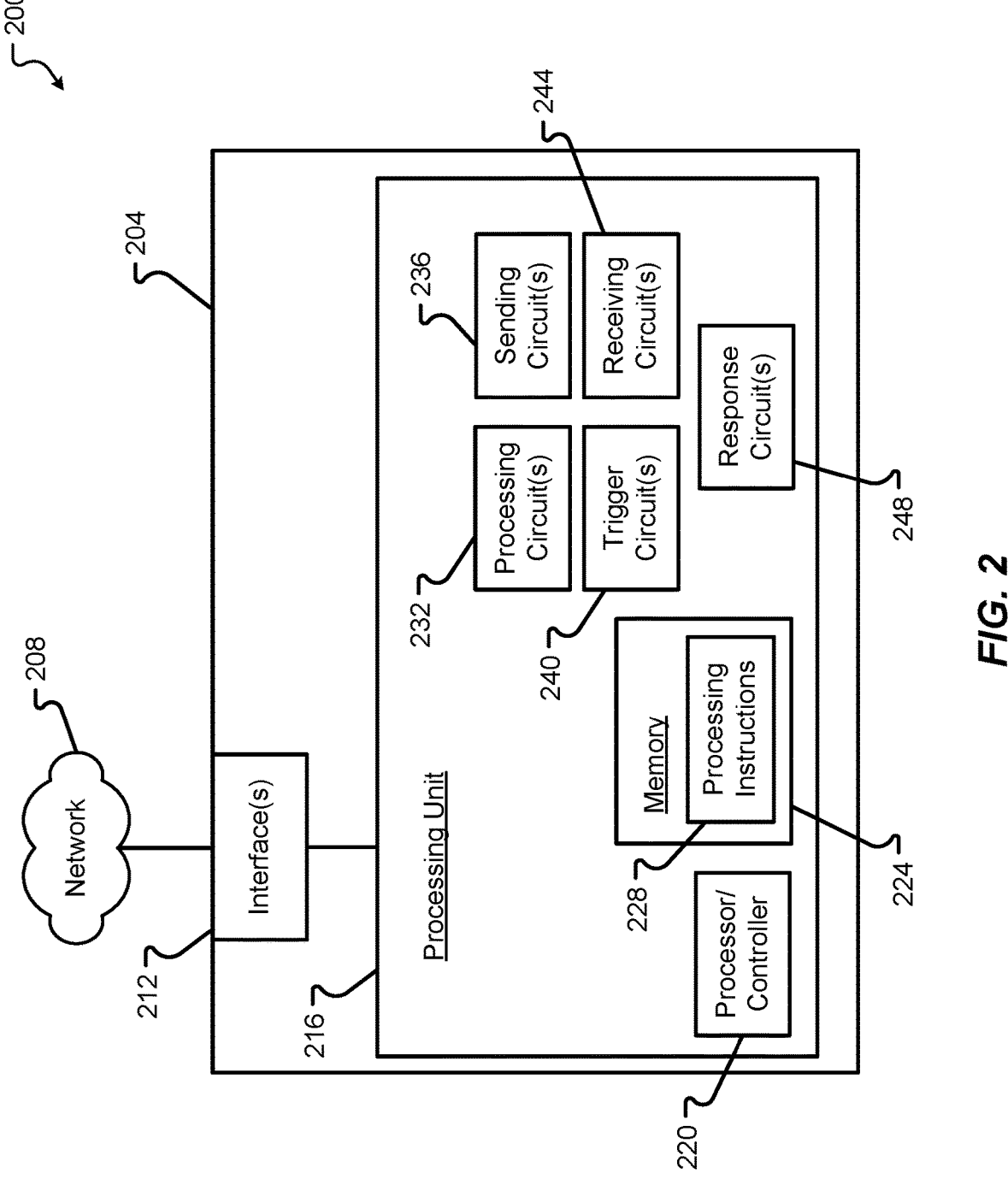
FIG. 2 is a block diagram illustrating a device eligible to join and operate as part of a collective in accordance with at least some embodiments of the present disclosure.

Referring now to FIG. 2, additional details of a device 204 that may be configured to contribute to the collective will be described in accordance with at least some embodiments of the present disclosure. The device 204 may correspond to an endpoint 104 as described with reference to FIGS. 1A-1D (e.g., network element, network device, process, etc.). Non-limiting examples of a device 204 include, without limitation, a switch, a server, a Network Interface Controller (NIC), an interface card, a Personal Computer (PC), a router, or the like. The device 204 is shown to be connected with a network 208 via a network interface 212. The device 204 is also shown to include a processing unit 216, which may include a processor 220, memory 224, and one or more circuits. The one or more circuits may be configured to perform functions in connection with executing a collective operation. Non-limiting examples of circuits that may be included in the device 104 are processing circuit(s) 232, sending circuit(s) 236, trigger circuit(s) 240, receiving circuit(s) 244, and response circuit(s) 248. The memory 224 is shown to include processing instructions 228, which may facilitate similar behavior as the processing circuit(s) 232 when executed by the processor 220.

The processing unit 216 may be configured to perform data processing functions for the device 204. As an example, the processing unit 216 in the form of a Central Processing Unit (CPU), Graphics Processing Unit (GPU), or Data Processing Unit (DPU), which may enable the device 204 to join a collective, communicate among members of the collective, process data according to the collective operation, etc.

The device interface 212 may connect with the communication network 208 via a communication link. The communication link may include a wired connection, a wireless connection, an electrical connection, etc. In some embodiments, the communication link may facilitate the transmission of data packets between the other devices connected to the network 208. Other members of a collective (e.g., other endpoints 104) may also be connected to the network 208. It should be appreciated that the communication link established between the interface 212 and the network 208 may include, without limitation, a PCIe link, a Compute Express Link (CXL) link, a high-speed direct GPU-to-GPU link (e.g., an NVlink), etc.

The memory 224 may include instructions 228 for execution by the processor 220 that, when executed by the processor 220, enable the processing unit 216 to perform any number of tasks (e.g., data routing tasks, data processing tasks, data aggregation tasks, data sending tasks, etc.). Alternatively or additionally, the processing unit 216 may utilize the one or more circuits to implement functionality of device 204. In some embodiments, the processing circuit(s) 232 may be configured to receive and process data as part of the collective operation. Processes that may be performed by the processing circuit(s) 232 include, without limitation, arithmetic operations, data reformatting operations, Boolean operations, etc.

The sending circuit(s) 236 may be configured to send an output of the processing circuit(s) 232 to other members/processes of the collective. As an example, the processing circuits(s) 232 may generate one or more outputs that are transmitted via the interface 212 to another endpoint of the collective (e.g., the endpoints 104 of the system 100). The sending circuit(s) 236 may be configured to format outputs of the processing circuit(s) 232 for transmission by the interface 212. The sending circuit(s) 236 may also be configured to operate or format data according to a communication protocol used within the network 208.

The trigger circuit(s) 240 may be configured to initiate operation of the processing circuit(s) 232. For instance, the trigger circuit(s) 240 may be configured to reference outputs of the response circuit(s) 248 and provide a signal to the processing circuit(s) 232 that causes the processing circuit(s) 232 to begin processing data as part of the collective operation based on the outputs of the response circuit(s) 248.

Thus, the trigger circuit(s) 240 may be considered an initiator for the processing circuit(s) 232.

The receiving circuit(s) 244 may be similar to the sending circuit(s) 236 in that the receiving circuit(s) 244 may be configured to operate in connection with the interface 212. In some embodiments, the receiving circuit(s) 244 may be configured to receive output(s) (e.g., output data) from one or more nodes/endpoints in a collective and format the output(s) for processing by the processing circuit(s) 232. In some embodiments, the receiving circuit(s) 244 may be configured to receive data from other endpoints in the collective and/or from the device 204 itself.

The response circuit(s) 248 may be configured to condition a response to one or more messages received via the receiving circuit(s) 244. For example, the receiving circuit(s) 244 of the device 204 may receive an SRN message from another device in the network 208 or from the sending circuit(s) 236. The response circuit(s) 248 may then condition a response to the SRN message based on whether the collective has begun an operation. If the collective has not begun the operation at the same time the SRN message is received, the response circuit(s) 248 may transmit an NRTR message (e.g., back to the other device in the network 208 or to the sending circuit(s) 236) and may queue the SRN message for later processing by the processing circuit(s) 232. In some embodiments, the SRN message may not be counted against a threshold quota (Ns) for the device that transmitted the SRN message based on the NRTR message being transmitted, where Ns defines a maximum number of outstanding sends that can be transmitted from a given endpoint to another endpoint among the collective.

In some embodiments, the response circuit(s) 248 may be enabled to respond to the SRN message when an RR message is received or when a new endpoint enters the collective (e.g., the trigger circuit(s) 240 may trigger the processing circuit(s) 232 to process the SRN message). Accordingly, when the RR message is received or when the new endpoint enters the collective and when the collective has begun the operation, the response circuit(s) 248 may determine if a number of outstanding RR operations is less than a first threshold (Nr) that defines a maximum number of outstanding receives in flight for a given endpoint from another endpoint among the collective. If the number of outstanding RR operations is less than Nr, the response circuit(s) 248 may initiate a data request to the device that sent the SRN message. Additionally or alternatively, if the number of outstanding RR operations is greater than or equal to Nr, the response circuit(s) 248 may queue the SRN message for later processing.

The processor 220 and/or circuit(s) 144 may include one or more Integrated Circuit (IC) chips, microprocessors, circuit boards, simple analog circuit components (e.g., resistors, capacitors, inductors, etc.), digital circuit components (e.g., transistors, logic gates, etc.), registers, Field Programmable Gate Arrays (FPGAs), Application Specific Integrated Circuits (ASICs), combinations thereof, and the like. It should be appreciated that the processor 220 may correspond to an optional component of the processing unit 216, especially in instances where the circuit(s) provide sufficient functionality to support operations of the processing unit 216 described herein. As noted above, the processing unit 216 may correspond to a CPU, GPU, DPU, combinations thereof, and the like. Thus, while only a single processing unit 216 is shown in the device 204, it should be appreciated that the device 204 may include multiple processing units 216 without departing from the scope of the present disclosure.

The memory 224 may include any number of types of memory devices. As an example, the memory 224 may include Random Access Memory (RAM), Read Only Memory (ROM), flash memory, Electronically-Erasable Programmable ROM (EEPROM), Dynamic RAM (DRAM), buffer memory, combinations thereof, and the like.

Referring now to FIGS. 3-6, additional details regarding operations of components in the system 100 will be described. While certain steps of the methods will be described as being performed in a particular order and by a particular component, it should be appreciated that embodiments of the present disclosure are not so limited. Specifically, the order of operations in the various methods may be modified and any component or combination of components in the system 100 may be configured to perform some or all of the method steps depicted and described herein.

Figure 3:
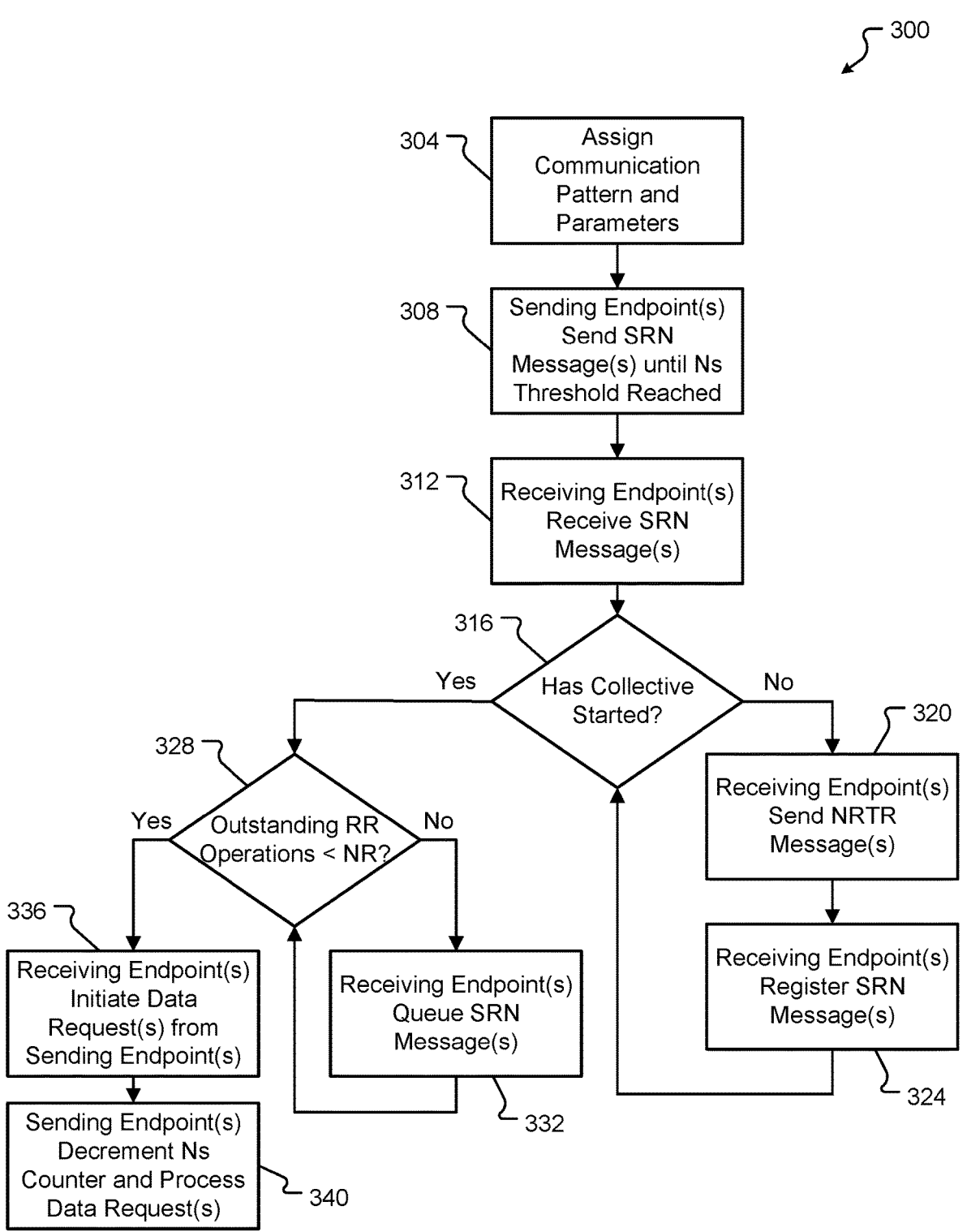
FIG. 3 is a flow diagram illustrating a collective operation in accordance with at least some embodiments of the present disclosure.

Referring to FIG. 3, a method 300 of executing a collective operation will be described in accordance with at least some embodiments of the present disclosure. The method 300 begins by initiating a collective call. During the collective call, the application may determine or specify a size of data to be processed at and/or shared between endpoints (e.g., processes) of the collective. In some embodiments, the application that calls the collective may include applications for value at risk (VAR) operations, weather codes, material science codes, or other applications not explicitly listed herein that include large data processing.

As part of initiating the collective call, the application may maintain or assign a communication pattern and different parameters for the collective (step 304). For example, the communication pattern may be a fixed data exchange pattern (e.g., the endpoints of the collective are assigned to a respective logical position in an ordered list) that corresponds to a global communication pattern in which each endpoint in the collective sends data to each other endpoint and each endpoint in the collective receives data from each other endpoint (e.g., all-to-all communication pattern, ring algorithm, ring exchange algorithm, etc.). In some embodiments, additional endpoints may be allowed to join the collective at an arbitrary time.

Additionally, the communication pattern may include communication parameters for the endpoints of the collective, such as no more than a first predetermined number of outstanding sends are configured to be transmitted from a given endpoint to another endpoint among the collective (Ns) and no more than a second predetermined number of outstanding receives are configured to be in flight for a given endpoint from another endpoint among the collective (Nr). Nr and Ns may be different values (e.g., each endpoint may support a different number of outstanding sends than a number of outstanding receives) or may be same values. Additionally, Nr and Ns may be assigned specifically to each endpoint of the collective, or each endpoint in the collective may be assigned same values for Nr and Ns.

The method 300 may continue with endpoints of the collective attempting to send data each of the other endpoints in the collective. For example, each sending endpoint may send an SRN message to a next endpoint destination in the ordered list of the communication pattern for the collective until each sending endpoint reaches Ns outstanding send requests (step 308). Subsequently, the receiving endpoints may receive the SRN messages (step 312). Before processing the SRN messages or attempting to process the SRN messages, the receiving endpoints may determine if the collective has started or not (step 316). For example, the receiving endpoints may determine whether the collective has begun an operation at the same time the SRN messages are received.

If the collective has not yet started, the receiving endpoint(s) may notify the sending endpoint(s) that the receiving endpoint(s) are not ready by sending NRTR messages to the sending endpoint(s) (step 320). Additionally, the receiving endpoint(s) may register the SRN messages (e.g., SRN requests) and queue the SRN messages for later processing (step 324). For example, the receiving endpoints may process the SRN messages as Nr slots become available, which may occur when endpoints enter the collective operation, an RR request is completed, the collective operation has begun, or a combination thereof.

If or when the collective has started (e.g., the collective begins the operation), the receiving endpoint(s) may determine if a number of outstanding RR operations is less than Nr (step 328). In some embodiments, if the number of outstanding RR operations is greater than or equal to Nr, the receiving endpoint(s) may queue the SRN message(s) for later processing (step 332). As described previously, Nr slots may become available when endpoints enter the collective operation and/or when an RR request is completed, and the receiving endpoint(s) may process SRN message(s) as a sufficient number of Nr slots become available. For example, if or when the number of outstanding operations becomes less than Nr, the receiving endpoint(s) may initiate data request(s) (DR) from the sending endpoint(s) (step 336). In some embodiments, the receiving endpoint(s) may initiate a DR from the sending endpoint(s) by transmitting an explicit RR message to the sending endpoint(s), transmitting a Remote Direct Memory Access (RDMA) read-request to the sending endpoint(s), or performing another mechanism to receive the data from the sending endpoint(s).

When an RR message (e.g., data request) arrives at the sending endpoint(s), the sending endpoint(s) may decrement their Ns counter(s) and process the RR message (step 340). The RR processing, which limits the number of such requests per receiving endpoint to Nr, may ensure that network endpoints control the number of messages destined to each of themselves. Additionally, possible communication (e.g., within the collective and/or outside the collective) may proceed without being blocked by endpoints that arrive later to the collective.

Figure 4:
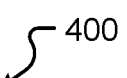
FIG. 4 is a flow diagram illustrating a method of executing a collective operation in accordance with at least some embodiments of the present disclosure.
Figure 4:
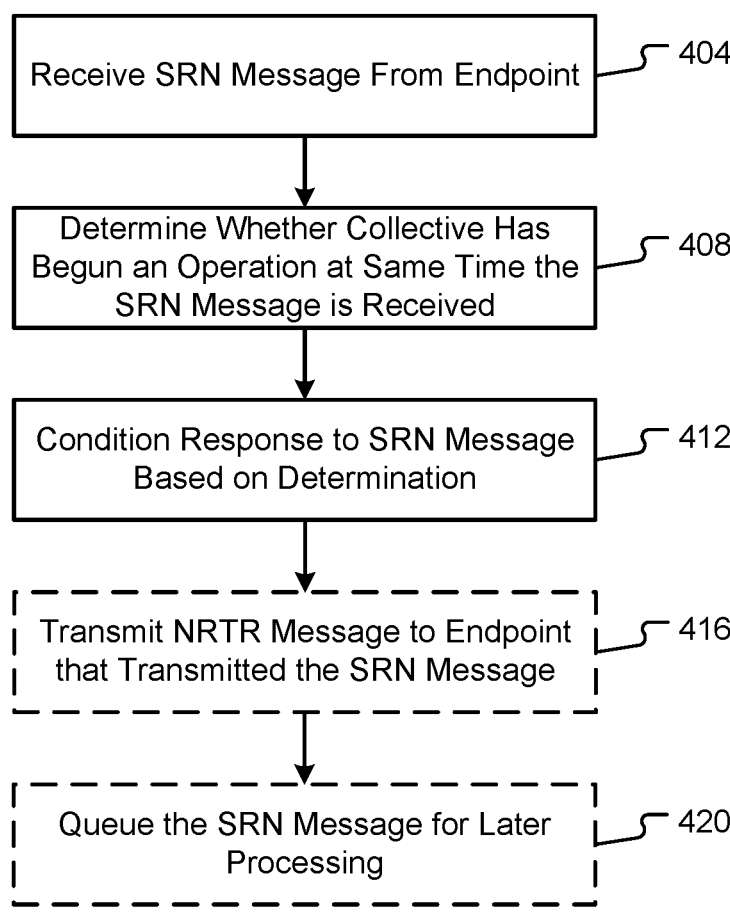

With reference now to FIG. 4, a method 400 of executing a collective operation is described in accordance with at least some embodiments of the present disclosure.

The method 400 (and/or one or more steps thereof) may be carried out or otherwise performed, for example, by at least one processor. The at least one processor may be the same as or similar to the processing unit 216 and/or processor(s) 220 of the device 204 described with reference to FIG. 2. The at least one processor may be part of an endpoint that belongs to a collective. A processor other than any processor described herein may also be used to execute the method 400. The at least one processor may perform the method 400 by executing elements stored in a memory such as the memory 224. The elements stored in the memory and executed by the processor may cause the processor to execute one or more steps of a function as shown in method 400.

The method 400 begins by receiving an SRN message from an endpoint (step 404). As described herein, the endpoint may correspond to one of a plurality of endpoints belonging to a collective, where each of the plurality of endpoints in the collective follows a data exchange pattern. For example, the data exchange pattern may correspond to a global communication pattern in which each endpoint in the collective sends data to each other endpoint and each endpoint in the collective receives data from each other endpoint. Additionally, the data exchange pattern may correspond to a global communication pattern in which no more than a first predetermined number, Ns, of outstanding sends are transmitted from a given endpoint to another endpoint among the collective and no more than a second predetermined number, Nr, of outstanding receives are in flight for a given endpoint from another endpoint among the collective. In some embodiments, additional endpoints may be allowed to join the collective at an arbitrary time.

The method 400 continues by determining whether the collective has begun an operation at the same time the SRN message is received (step 408). The method 400 then continues by conditioning a response to the SRN message based on determining whether the collective has begun the operation at the same time the SRN message is received (step 412).

When the collective has not begun the operation at the same time the SRN message is received, the method 400 may continue by transmitting an NRTR message back to the endpoint that transmitted the SRN message (step 416). Additionally, the method 400 may include queuing the SRN message for later processing in response to determining that the collective has not begun the operation at the same time the SRN message is received (step 420). In some embodiments, the SRN message is not counted against a threshold quota (Ns) for the endpoint that transmitted the SRN message based on the NRTR message being transmitted back to the endpoint that transmitted the SRN message.

The present disclosure encompasses embodiments of the method 400 that comprise more or fewer steps than those described above, and/or one or more steps that are different than the steps described above.

Figure 5:
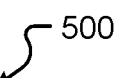
FIG. 5 is a flow diagram illustrating a method of queueing messages for later processing in a collective operation in accordance with at least some embodiments of the present disclosure.
Figure 5:
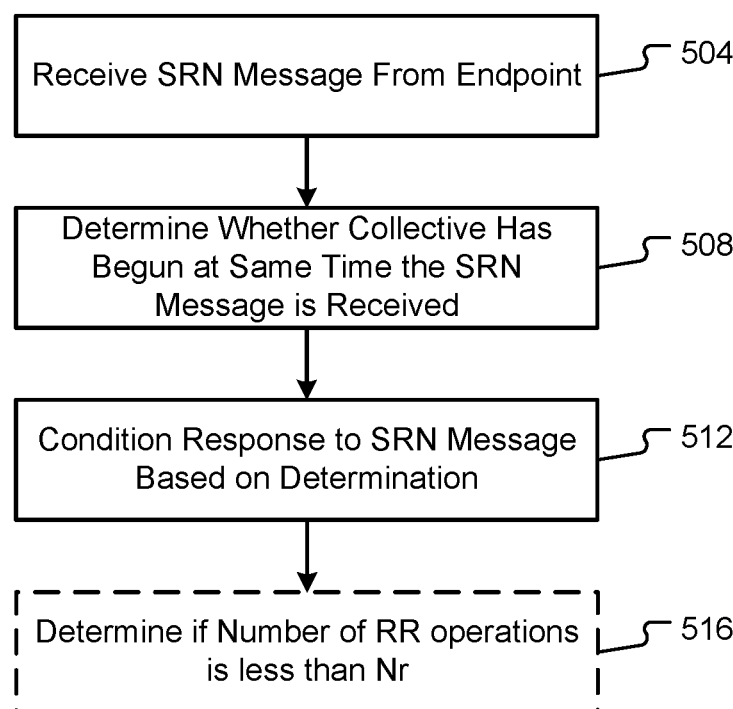

Referring now to FIG. 5, a method 500 of queueing messages for later processing in a collective operation is described in accordance with at least some embodiments of the present disclosure.

The method 500 (and/or one or more steps thereof) may be carried out or otherwise performed, for example, by at least one processor. The at least one processor may be the same as or similar to the processing unit 216 and/or processor(s) 220 of the device 204 described with reference to FIG. 2. The at least one processor may be part of an endpoint that belongs to a collective. A processor other than any processor described herein may also be used to execute the method 500. The at least one processor may perform the method 500 by executing elements stored in a memory such as the memory 224. The elements stored in the memory and executed by the processor may cause the processor to execute one or more steps of a function as shown in method 500.

In some examples, the method 500 may include steps previously described in greater detail with reference to FIG. 4. For example, the method 500 comprises receiving an SRN message from an endpoint (step 504). The method 500 also comprises determining whether the collective has begun an operation at the same time the SRN message is received (step 508). The method 500 also comprises conditioning a response to the SRN message based on determining whether the collective has begun the operation at the same time the SRN message is received (step 512). Steps 504, 508, and 512 may correspond to steps 404, 408, and 412, respectively, as described with reference to FIG. 4.

When the collective has been determined to have begun, the method 500 continues by determining whether a number of outstanding RR operations is less than a first threshold (Nr) that defines a maximum number of outstanding receives in flight for a given endpoint among the collective (step 516). In some embodiments, if the number of outstanding RR operations is less than Nr, the method 500 may include initiating a data request from the endpoint that transmitted the SRN message. For example, initiating the data request may include transmitting a data request to the endpoint that transmitted the SRN message. Additionally or alternatively, if the number of outstanding RR operations is greater than or equal to Nr, the method 500 may include queueing the SRN message for later processing. In some embodiments, responding to the SRN message may be enabled when an RR message is received or when a new endpoint enters the collective. Additionally, in some embodiments, the SRN message may be removed from the queue based on the data request being transmitted, data from the endpoint that transmitted the SRN message being received in response to transmitting the data request, or a combination thereof.

The present disclosure encompasses embodiments of the method 500 that comprise more or fewer steps than those described above, and/or one or more steps that are different than the steps described above.

As noted above, the present disclosure encompasses methods with fewer than all of the steps identified in FIGS. 4 and 5 (and the corresponding description of the methods 400 and 500), as well as methods that include additional steps beyond those identified in FIGS. 4 and 5 (and the corresponding description of the methods 400 and 500). The present disclosure also encompasses methods that comprise one or more steps from one method described herein, and one or more steps from another method described herein. Any correlation described herein may be or comprise a registration or any other correlation.

Specific details were given in the description to provide a thorough understanding of the embodiments. However, it will be understood by one of ordinary skill in the art that the embodiments may be practiced without these specific details. In other instances, well-known circuits, processes, algorithms, structures, and techniques may be shown without unnecessary detail in order to avoid obscuring the embodiments.

The foregoing is not intended to limit the disclosure to the form or forms disclosed herein. In the foregoing Detailed Description, for example, various features of the disclosure are grouped together in one or more aspects, embodiments, and/or configurations for the purpose of streamlining the disclosure. The features of the aspects, embodiments, and/or configurations of the disclosure may be combined in alternate aspects, embodiments, and/or configurations other than those discussed above. This method of disclosure is not to be interpreted as reflecting an intention that the claims require more features than are expressly recited in each claim. Rather, as the following claims reflect, inventive aspects lie in less than all features of a single foregoing disclosed aspect, embodiment, and/or configuration. Thus, the following claims are hereby incorporated into this Detailed Description, with each claim standing on its own as a separate preferred embodiment of the disclosure.

Moreover, though the foregoing has included description of one or more aspects, embodiments, and/or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and/or configurations to the extent permitted, including alternate, interchangeable and/or equivalent structures, functions, ranges, or steps to those claimed, whether or not such alternate, interchangeable and/or equivalent structures, functions, ranges or steps are disclosed herein, and without intending to publicly dedicate any patentable subject matter.

What is claimed is:

1. A device, comprising:
   sending circuitry to send, over a communication network that supports message exchange using a communication protocol, a Send Ready Notification (SRN) message, formatted according to the communication protocol, to a first endpoint, wherein the first endpoint corresponds to one of a plurality of endpoints belonging to a collective, and wherein each of the plurality of endpoints in the collective follows a data exchange pattern;
   receiving circuitry to receive, over the communication network, another SRN message, formatted according to the communication protocol, from a second endpoint in the plurality of endpoints; and
   response circuitry to respond to the SRN message received from the second endpoint based on whether the collective has begun an operation.

2. The device of claim 1, wherein, when the collective has not begun the operation at the same time the SRN message is received from the second endpoint, the response circuitry transmits a Not Ready To Receive (NRTR) message back to the second endpoint.

3. The device of claim 2, wherein, when the collective has not begun the operation at the same time the SRN message is received from the second endpoint, the response circuitry queues the SRN message received from the second endpoint.

4. The device of claim 1, wherein, when the collective has begun the operation at the same time the SRN message is received from the second endpoint, the response circuitry determines if a number of outstanding Receiver-Ready (RR) operations is less than a first threshold (Nr) that defines a maximum number of outstanding receives.

5. The device of claim 4, wherein the response circuitry initiates a data request from the second endpoint in response to determining that the number of outstanding RR operations is less than Nr.

6. The device of claim 4, wherein the response circuitry queues the SRN message received from the second endpoint in response to determining that the number of outstanding RR operations is greater than or equal to Nr.

7. The device of claim 1, wherein the data exchange pattern corresponds to a global communication pattern in which each endpoint in the collective sends data to each other endpoint, and wherein each endpoint in the collective receives data from each other endpoint.

8. The device of claim 1, wherein the data exchange pattern corresponds to a global communication pattern in which no more than a first predetermined number, Ns, of outstanding sends are in flight from or to a given endpoint in the collective and no more than a second predetermined number, Nr, of outstanding receives are in flight from or to the given endpoint.

9. The device of claim 1, wherein additional endpoints are allowed to join the collective at an arbitrary time.

10. The device of claim 1, wherein the response circuitry is enabled to respond to the SRN message from the second endpoint when a Receive Ready (RR) message is received or when a new endpoint enters the collective.

11. A system, comprising:
an endpoint that belongs to a collective, wherein the endpoint comprises one or more circuits to:
  receive, over a communication network that supports message exchange using a communication protocol, a Send Ready Notification (SRN) message, formatted according to the communication protocol, from another endpoint in the collective; and
  respond to the SRN message based on whether the collective has begun an operation.

12. The system of claim 11, wherein, when the collective has not begun the operation at the same time the SRN message is received from the other endpoint, the one or more circuits transmit a Not Ready To Receive (NRTR) message back to the other endpoint that transmitted the SRN message.

13. The system of claim 12, wherein, when the collective has not begun the operation at the same time the SRN message is received from the other endpoint, the one or more circuits queue the SRN message received from the other endpoint for later processing by the endpoint.

14. The system of claim 13, further comprising:
the other endpoint, wherein the other endpoint maintains its threshold quota (Ns) associated with SRN messages based at least in part on receiving the NRTR message transmitted from the endpoint, and wherein Ns defines a maximum number of outstanding sends.

15. The system of claim 11, wherein each endpoint in the collective follows a data exchange pattern.

16. The system of claim 11, wherein, when the collective has begun the operation at the same time the SRN message is received at the endpoint, the one or more circuits determine if a number of outstanding Receiver-Ready (RR) operations is less than a first threshold (Nr) that defines a maximum number of outstanding receives.

17. A method, comprising:
receiving, over a communication network that supports message exchange using a communication protocol, a Send Ready Notification (SRN) message from an endpoint, wherein the endpoint corresponds to one of a plurality of endpoints belonging to a collective, and wherein each of the plurality of endpoints in the collective follows a data exchange pattern;
determining whether the collective has begun an operation at the same time the SRN message is received; and
responding to the SRN message based on determining whether the collective has begun the operation at the same time the SRN message is received.

18. The method of claim 17, wherein, when the collective has not begun the operation at the same time the SRN message is received, the method further comprises:
transmitting a Not Ready To Receive (NRTR) message back to the endpoint that transmitted the SRN message.

19. The method of claim 18, further comprising:
queuing the SRN message for later processing in response to determining that the collective has not begun the operation at the same time the SRN message is received.

20. The method of claim 19, further comprising:
determining that the collective has begun the operation;
in response to determining that the collective has begun the operation, determining whether a number of outstanding Receiver-Ready (RR) operations is less than a first threshold (Nr) that defines a maximum number of outstanding receives; and
transmitting a data request based at least in part on the number of outstanding RR operations being less than Nr.

* * * * *